July 4, 1961 G. T. PFLEGER 2,991,380
MAGNETIC CORE STRUCTURE FOR DYNAMO-ELECTRIC MACHINES
Filed Nov. 25, 1957
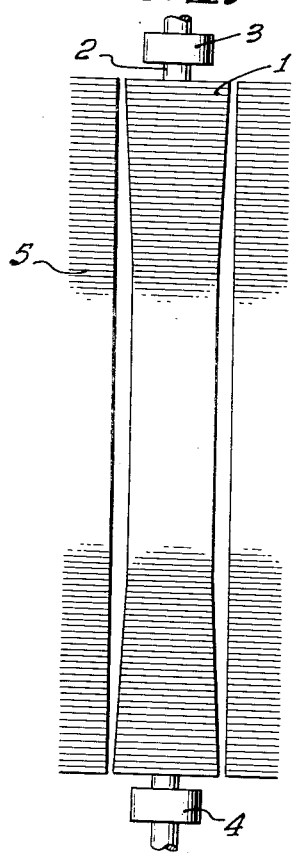
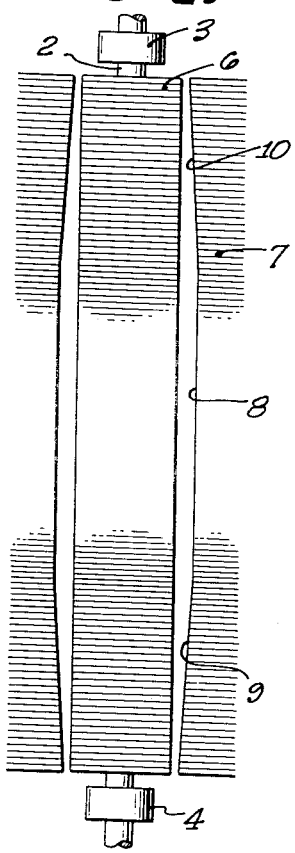
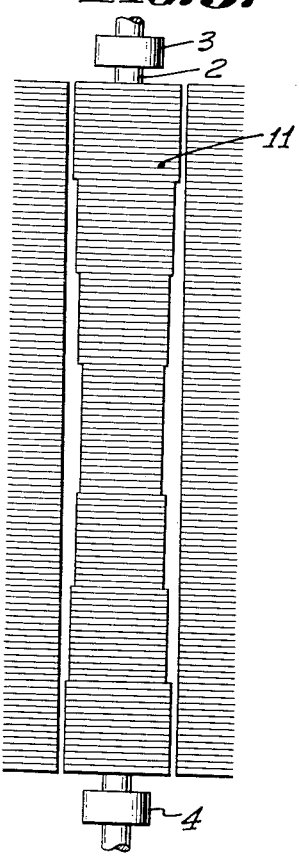
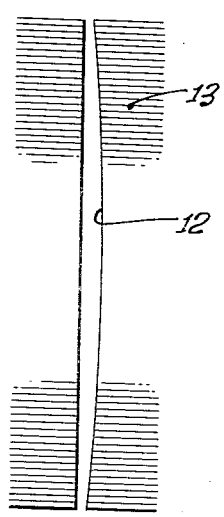
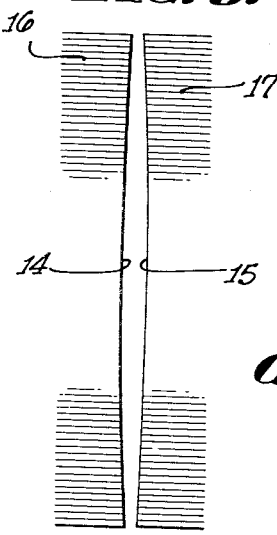
GEORGE T. PFLEGER,
INVENTOR.
BY Flam and Flam
ATTORNEYS.

United States Patent Office 2,991,380
Patented July 4, 1961

2,991,380
MAGNETIC CORE STRUCTURE FOR DYNAMO-
ELECTRIC MACHINES
George T. Pfleger, Newport Beach, Calif., assignor to
U.S. Electrical Motors, Inc., Los Angeles, Calif., a
corporation of California
Filed Nov. 25, 1957, Ser. No. 698,726
12 Claims. (Cl. 310—262)

This invention relates generally to dynamo-electric machines utilizing stator and rotor core members made from magnetic material, such as iron laminations.

Such stator and rotor members are often utilized for induction motors, in which the rotor member carries a secondary winding. The secondary may be a squirrel-cage or of the wound type.

Such motors are commonly in use for use in a well for driving a pump. To adapt them for submersible use, the overall diameter of the motor structure must be kept as small as possible. Accordingly, to attain the necessary power for driving the pump, the axial lengths of the core members must be quite large. It is not too unusual to provide an axial length of about thirty inches for these core members, the cooperating inner and outer diameters being about three inches, and the shaft for the rotor of about one inch in diameter. Since the bearings for the shaft are correspondingly spaced far apart, and since the shaft is of relatively small diameter and correspondingly somewhat flexible, the resistance of the rotor member to transverse bending is reduced.

When the motor is energized, the transverse magnetic pull-over may deflect the shaft sufficiently to reduce the air-gap between the stator and rotor to zero, especially at the midportion of the core members. To overcome such effects, the normal air-gap length is increased, but only at the expense of efficiency.

It is one of the objects of this invention to improve the efficiency of such motors and yet to ensure against mechanical interference between the stator and the rotor members.

In order to accomplish this result, the normal air-gap is so arranged that it is greatest at the place where maximum shaft deflection may occur, and least at the ends of the members.

It is therefore another object of this invention to provide such a configuration of the opposed areas of the stator and rotor members, as to provide this type of air-gap.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a diagrammatic representation of the magnetic members for the stator and rotor of a dynamo-electric machine, the windings being omitted, the length of the air-gap being greatly exaggerated for the sake of clarity;

FIGS. 2 and 3 are views similar to FIG. 1, of modified forms of the invention;

FIG. 4 is a fragmentary view, similar to FIG. 1, of a further modified form of the invention; and FIG. 5 is a view similar to FIG. 4 of a still further modified form of the invention.

In FIG. 1 the stack of rotor laminations 1 is shown as mounted on a shaft 2 having bearing supports 3 and 4. The rotor stack 1 is disposed within a stator stack 5.

In motors adapted for submersible use, the rotor stack 1 is of relatively small diameter; for example, about three or four inches; and each stack 1 and 5 is, for example, from twenty-four to thirty inches long. The shaft 2 is approximately one inch in diameter.

Since the overall diameter of the motor must be kept relatively small so as to make it possible to place the motor within a well bore, the shaft 2 is of small size. Furthermore, the bearings 3 and 4 are disposed a substantial distance apart. There is accordingly danger of deflection or pull-over of the rotor 1, under the influence of the magnetic forces. Such a pull-over may cause actual physical contact between the rotor stack 1 and the stator stack 5.

In order to obviate this, the air-gap is increased at a central portion of the stack 1. This is shown greatly exaggerated in FIG. 1.

For example, if the air-gap at the ends of the stack 1 is .010 inch, then at the center of the stack it may be as much as .020 inch. Accordingly, in the event of deflection or pull-over at the center portion of the stack, the clearance between the rotor stack 1 and the stator stack 5 may yet be maintained by lengthening the gap only over a limited middle portion of the magnetic stacks.

The midportion of the stack 1 may be cylindrical and may have a total axial length of about one-half the total length of the rotor stack 1. The end portions are shown as generally of conical configuration; cones defining the envelopes for the laminations comprising the stack 1.

In the form of the invention illustrated in FIG. 2, a rotor stack 6 is shown having a uniform diameter. The stator stack 7, however, in this instance is shown as providing an increased air-gap at the midportion of the stack. Thus the central portion 8 of the inner periphery of the stator stack 7 is somewhat enlarged, and the end portions 9 and 10 of this inner periphery are substantially conical in shape. Again, the air-gap at the central portion is about twice as great as the air-gap at the ends of the stacks; i.e. the center portion air-gap may, for example, be .020 inch long. These air-gap lengths are shown greatly exaggerated.

When the shaft 2 deflects due to magnetic pull-over, it assumes a form quite close to a catenary or parabola. Theoretically therefore, the rotor stack 1 of FIG. 1 may have a periphery defined or enveloped by a curve corresponding to a catenary or parabola. An approximation for this may be obtained by the structure illustrated in FIG. 3. In this form, the rotor stack 11 has a gradually decreasing diameter toward the center or midportion of the stack. Thus, the stack 11 is formed of cylindrical portions, the envelope of which may constitute a theoretically correct curve corresponding to the possible deflection of shaft 2.

In FIG. 4, the curved periphery 12 of the stack 13 may be obtained in any desired manner as by the aid of a machining operation, or by forming the stack of laminations of constantly decreasing diameter toward the central portion of the stack. In this example, the curved periphery 12 may be formed either on the stator or on the rotor.

In the example shown in FIG. 5, curved peripheries 14 and 15 are formed on both the stator stack 16 and the corresponding rotor stack 17, the extreme radial distance between the curves being, for example, .020 inch.

The inventor claims:

1. A magnetic core member for a dynamo-electric machine and including relatively rotatable parts with an annular air gap between the parts, the ratio of the length of the rotary part to the diameter of the periphery that defines the air gap being no less than six; a shaft for the rotary part; and bearings respectively supporting opposite ends of the shaft; said shaft being of such size as to cause transverse deflections of the shaft due to magnetic forces exerted on the rotary part; said magnetic core member having provisions for ensuring against mechanical contact between the rotary and the stationary parts and consisting of a substantially larger air gap at the middle portion of the member than at the ends of the core.

2. In combination, a pair of magnetic core members for a dynamo-electric machine, and defining an air-gap between them, one of said members being rotary, and the other being non-rotary, and the cooperating peripheries of the members being so shaped that the air-gap has a maximum length intermediate the ends of the members, to permit substantial lateral deflection of the rotary member; the length of the rotary member being at least six times the maximum diameter of said rotary member.

3. The combination as set forth in claim 1, in which the periphery of the rotary member is such that it has an hour-glass shape.

4. The combination as set forth in claim 1, in which the periphery of the non-rotary member is such that it has a maximum diameter intermediate its ends.

5. The combination as set forth in claim 1, in which the middle portion of the periphery of at least one of the members is cylindrical, and the remaining portions thereof being conical.

6. The combination as set forth in claim 1, in which the middle portion of the periphery of the rotary member is cylindrical, and the remaining portions thereof being conical.

7. The combination as set forth in claim 1, in which the middle portion of the periphery of the non-rotary member is cylindrical, and the remaining portions thereof being conical.

8. The combination as set forth in claim 1, in which the periphery of the rotary member is so stepped as to provide a minimum diameter at an intermediate place of the member.

9. The combination as set forth in claim 1, in which the periphery of the non-rotary member is so stepped as to provide a maximum diameter at an intermediate place of the member.

10. The combination as set forth in claim 1, in which the periphery of one of the members has an envelope in the form of a continuous curve, to provide a maximum air-gap at an intermediate point of the member.

11. The combination as set forth in claim 1, in which the periphery of the rotary member has an envelope in the form of a concave curve.

12. The combination as set forth in claim 1, in which the peripheries of both members bow inwardly.

References Cited in the file of this patent
UNITED STATES PATENTS

| | | |
|---|---|---|
| 982,784 | Behrend et al. | Jan. 31, 1911 |
| 2,055,480 | Coberly | Sept. 29, 1936 |